(12) United States Patent
Copeland

(10) Patent No.: US 6,661,192 B2
(45) Date of Patent: Dec. 9, 2003

(54) CONTROLLING A BRUSHLESS DC MOTOR

(75) Inventor: Michael P. Copeland, San Jose, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/224,670

(22) Filed: Aug. 20, 2002

(65) Prior Publication Data

US 2002/0195982 A1 Dec. 26, 2002

Related U.S. Application Data

(63) Continuation of application No. 09/557,994, filed on Apr. 25, 2000, now Pat. No. 6,462,495.

(51) Int. Cl.[7] .................................................. H02P 6/18
(52) U.S. Cl. ....................... 318/439; 318/254; 318/500; 318/721
(58) Field of Search ................................ 318/138, 254, 318/439, 459, 500, 720–724

(56) References Cited

U.S. PATENT DOCUMENTS

| | | | |
|---|---|---|---|
| 5,057,753 A | 10/1991 | Leuthold et al. | |
| 5,202,613 A | 4/1993 | Kruse | |
| 5,202,614 A | 4/1993 | Peters et al. | |
| 5,221,881 A | 6/1993 | Cameron | |
| 5,245,256 A | 9/1993 | Cassat et al. | |
| 5,343,127 A | 8/1994 | Maiocchi | |
| 5,367,234 A | 11/1994 | DiTucci | |
| 5,382,889 A | 1/1995 | Peters et al. | |
| 5,491,978 A | 2/1996 | Young et al. | |
| 5,517,095 A | * 5/1996 | Carobolante et al. ....... | 318/254 |
| 5,631,999 A | * 5/1997 | Dinsmore .................. | 388/805 |
| 5,635,810 A | * 6/1997 | Goel ......................... | 318/719 |
| 5,646,491 A | 7/1997 | Erdman et al. | |
| 5,708,337 A | 1/1998 | Breit et al. | |
| 5,731,670 A | * 3/1998 | Galbiati et al. ............. | 318/254 |
| 5,744,921 A | 4/1998 | Makaran | |
| 5,767,654 A | 6/1998 | Menegoli et al. | |
| 5,821,708 A | 10/1998 | Williams et al. | |
| 5,838,128 A | 11/1998 | Maiocchi et al. | |
| 5,859,520 A | 1/1999 | Bourgeois et al. | |
| 5,886,485 A | 3/1999 | Jang | |
| 5,886,486 A | 3/1999 | Jeong et al. | |
| 5,923,134 A | 7/1999 | Takekawa | |
| 5,990,643 A | 11/1999 | Holling et al. | |
| 6,023,141 A | * 2/2000 | Chalupa ..................... | 318/439 |
| 6,153,989 A | * 11/2000 | Kardash et al. ............. | 318/254 |

OTHER PUBLICATIONS

Charles Phillips et al; "Digital Control System Analysis and Design", Third Edition, Prentice Hall Publisher, NJ 07732, 1995. pp. 122–123 for Analog–to–Digital Conversion.*

* cited by examiner

Primary Examiner—Bentsu Ro
(74) Attorney, Agent, or Firm—Fish & Richardson P.C.

(57) ABSTRACT

Systems and methods for controlling a polyphase brushless direct current (DC) motor (42) are described. One system includes a meter (14) coupled to a motor terminal (A, B, C) and adapted to produce a range of digital output values (44) representative of a motor terminal signal from which a back EMF signal is derivable. The system (10) also may include a controller (16) that is coupled to the meter (14, 42) and is operable to monitor the range of meter output values and to compute a motor commutation time based upon a monitored local minimum meter output value and a monitored local maximum meter output value. A pulse width modulation (PWM) circuit (26) may be provided, and the meter (14, 42) may be synchronized with the PWM circuit (26). Zero crossings in the back EMF signals are identified based upon direct measurements of the signals at the motor terminals.

11 Claims, 6 Drawing Sheets

CONTROLLING A BRUSHLESS DC MOTOR

CROSS-REFERENCE

This application is a continuation application of and claims priority to U.S. application Ser. No. 09/557,994, filed on Apr. 25, 2000, now U.S. Pat. No. 6,462,495, the entire disclosure of which is incorporated by reference.

TECHNICAL FIELD

This invention relates to systems and methods for controlling a brushless DC (direct-current) motor.

BACKGROUND

Brushless DC motors, also known as self-synchronous or electronically commutated motors, may be used in a variety of mechanical systems, including motor vehicles and aerospace systems. For example, brushless DC motors may be found in automotive engine cooling systems and in heating, ventilation and air-conditioning (HVAC) equipment. A brushless DC motor typically includes a plurality of windings (or coils) wound about a stator, and a plurality of permanent magnets mounted on a rotor. An electronic control system switches current in the stator windings in a process known as commutation. The control system senses the position of the rotor and applies a coordinated sequence of control signals to electronic switches (e.g., transistors) that control the flow of current through the stator windings. The sequential switching of current through the motor windings produces a magnetic flux that rotates the rotor. Drive currents may be applied to the motor windings continuously in a linear mode of operation, or discontinuously in a nonlinear mode of operation using, e.g., pulse width modulation (PWM) techniques.

In order to apply the proper drive currents to the stator windings, the position of the rotor with respect to the conducting (or active) stator windings must be known. Various techniques may be used to detect the position of the rotor. For example, some systems derive rotor position information from sensors (e.g., Hall-effect sensors and optical sensors) coupled to the motor shaft. Other systems derive rotor position information from the back electromotive force (EMF) voltages generated in the windings as the motor rotates.

SUMMARY

The invention features systems and methods for controlling a polyphase brushless direct current (DC) motor having a plurality of phase windings energizable by timed application of drive voltages to a plurality of motor terminals resulting in back electromotive force (EMF) conditions at the motor terminals.

In one aspect, the invention features a system comprising a meter coupled to a motor terminal and adapted to produce a range of digital output values representative of a motor terminal signal from which a back EMF signal may be derived.

In another aspect, the invention features a system comprising a meter, and a controller coupled to the meter and operable to monitor the range of meter output values and to compute a motor commutation time based upon a monitored local minimum meter output value and a monitored local maximum meter output value.

The invention also features a system comprising a pulse width modulation (PWM) circuit, and a meter coupled to a motor terminal, synchronized with the PWM circuit and configured to produce an output representative of a motor terminal signal from which a back EMF signal may be derived.

Embodiments may include one or more of the following features.

The meter may include an analog-to-digital (A/D) converter. A buffer may be coupled between the motor terminal and the meter. The buffer preferably is configured to scale the terminal signal values to a selected range. The buffer may include a voltage divider.

The motor commutation time preferably is computed based upon an identified phase-to-phase zero crossing in a back EMF signal. The controller may be configured to store a local minimum meter output value and a local maximum meter output value every motor terminal driving cycle. The zero crossing preferably is identified when the meter output value is substantially equal to one-half of the difference between the local maximum meter output value and the local minimum meter output value.

When the meter is synchronized with a PWM circuit, the meter preferably is adapted to sample motor terminal voltages in a non-conducting motor phase at times when each conducting motor phase is being driven.

In another aspect, the invention features a method of controlling a polyphase brushless direct current (DC) motor. In accordance with this inventive method, a range of signal values representative of a motor terminal signal from which a back EMF signal may be derived is monitored. Over the range of monitored signal values, a local maximum signal value and a local minimum signal value are stored. A motor commutation time is computed based upon the stored local maximum signal value and the stored local minimum value.

Among the advantages of the invention are the following.

The invention determines when zero crossings in the back EMF signals occur based upon direct measurements of the motor terminal signals. In this way, the invention avoids the sensors and complex circuitry, such as an ASIC or a plurality of comparators, that typically are used to determine when zero crossings occur. Furthermore, because the local maximum back EMF signal values and the local minimum back EMF signal values may be measured periodically (e.g., once every driving cycle), the invention readily accommodates component drifts and temperature variations.

Other features and advantages of the invention will become apparent from the following description, including the drawings and the claims.

DETAILED DESCRIPTION

Figure 1A:
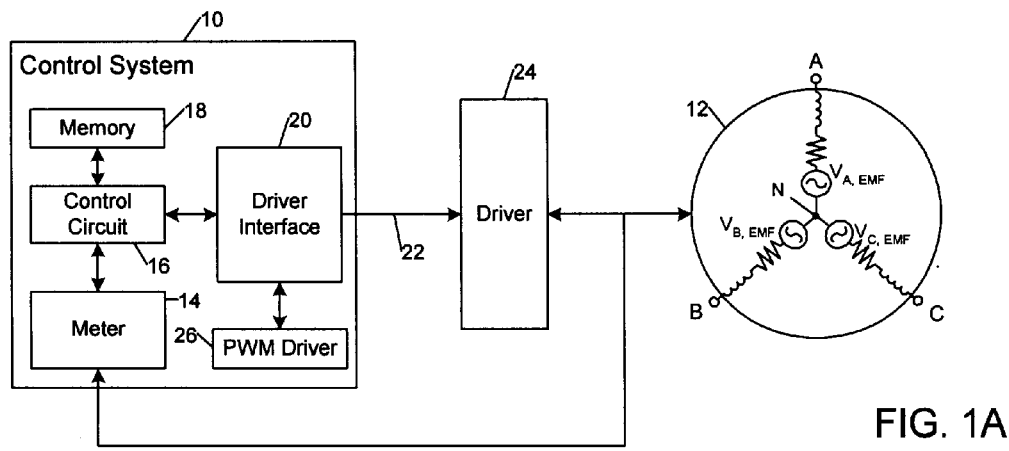
FIG. 1A is a block diagram of control system and a driver for a polyphase brushless DC motor.

Referring to FIG. 1A, a system 10 for controlling a polyphase brushless DC motor 12 includes a meter 14, a control circuit 16, a memory 18, and a driver interface 20. Driver interface 20 supplies control signals 22 to a driver 24, which includes a plurality of switching transistors for driving the terminals A, B, C of motor 12. In operation, during each driving cycle, two of the terminals (e.g., terminals B and C) are energized (one terminal is driven high and one terminal is driven low) and the third terminal (e.g., terminal A) is floating. The terminal drive currents are commutated to operate the motor in a stable, substantially jitterless way. The motor coils are commutated based upon information derived from back EMF voltages ($V_{EMF}$) that are measured during a floating (non-conducting) driving phase of each terminal A–C. The back EMF voltages may be measured between terminals A, B, C and a reference voltage (e.g., the voltage at the center tap N of the motor windings).

As explained in detail below, control system 10 is configured to identify "zero crossings" in the back EMF voltages based upon direct measurement of the terminal voltages. In particular, zero crossings are identified when the floating terminal voltage is halfway between a local minimum back EMF voltage and a local maximum back EMF voltage. The time span between adjacent zero crossings corresponds to the driving voltage phase delay. The motor coils preferably are commutated at a time corresponding to one half of a phase delay after each identified zero crossing; although the motor coils may be commutated at other times.

Meter 14 is coupled to terminals A, B, C of motor 12 and is configured to produce a range of output values representative of terminal voltages from which the back EMF signals may be derived. In a PWM mode of operation, meter 14 is synchronized with a PWM driving circuit 26 and samples voltage values from the non-conducting phase terminal at times when the switching transistors driving the conducting phase terminals are active. Zero crossings in the back EMF signals are computed from direct measurements of the voltages at the motor terminals. Control circuit 16 preferably stores in memory 18 a local minimum meter output value and a local maximum meter output value, and computes motor commutation times based upon the stored meter output values.

Figure 1B:
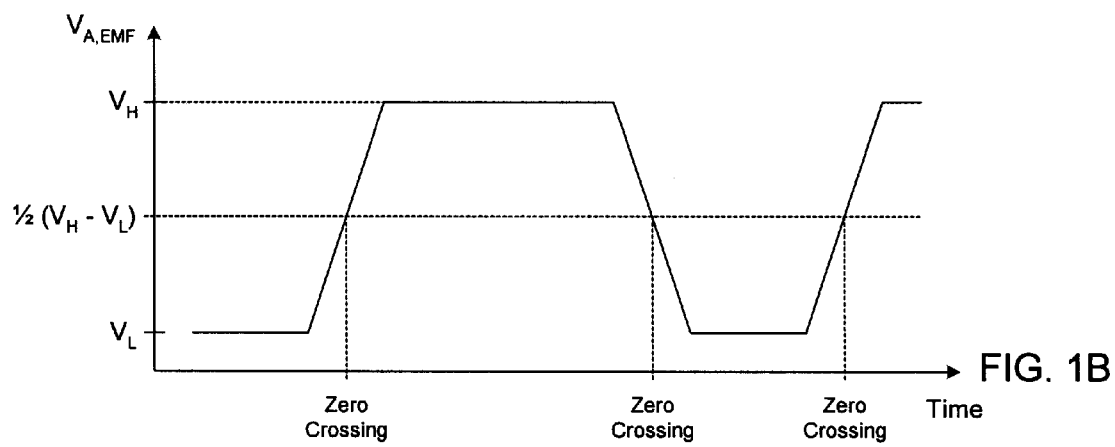
FIG. 1B is a plot over time of a voltage signal at a terminal of a motor in a linear mode of operation.
Figure 1C:
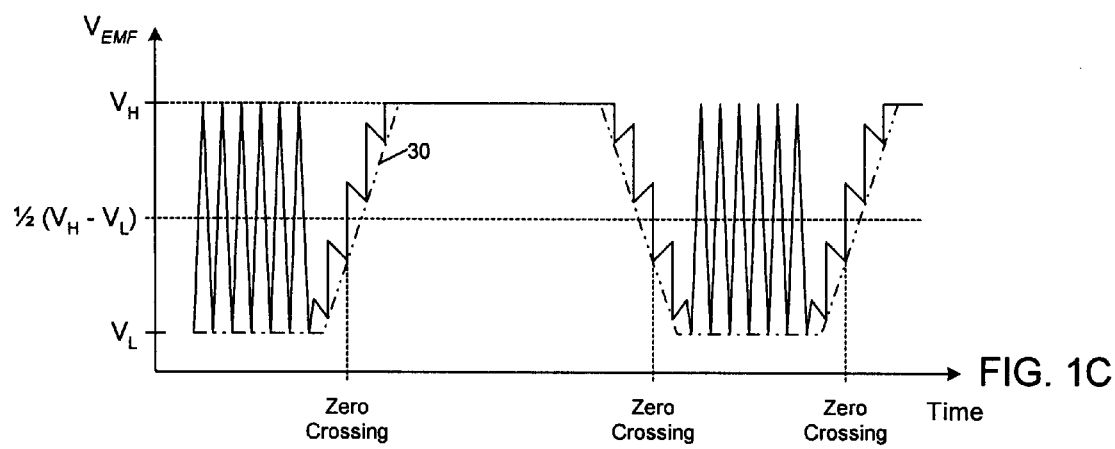
FIG. 1C is a plot over time of a voltage signal at a terminal of a motor in a PWM mode of operation.

Referring to FIGS. 1B and 1C, in a linear mode of operation (FIG. 1B), each cycle of the terminal voltage has a characteristic "trapezoidal" profile over time. The measured motor terminal voltages range between a local minimum value $V_L$ and a local maximum value $V_H$. Zero crossings in the back EMF signals are identified at times when the terminal voltage reaches a value that is equal to one half of the difference between the local maximum value and the local minimum value. In a PWM mode of operation (FIG. 1C), the terminal voltage includes a plurality of voltage spikes that are the result of the PWM switching. A trapezoidal profile 30, however, may be recovered from the back EMF signal by sampling the minima of the spike voltages, which correspond to the times when the on-phase switching transistors of driver 24 are active (i.e., when the conducting phases are active).

Figure 2:
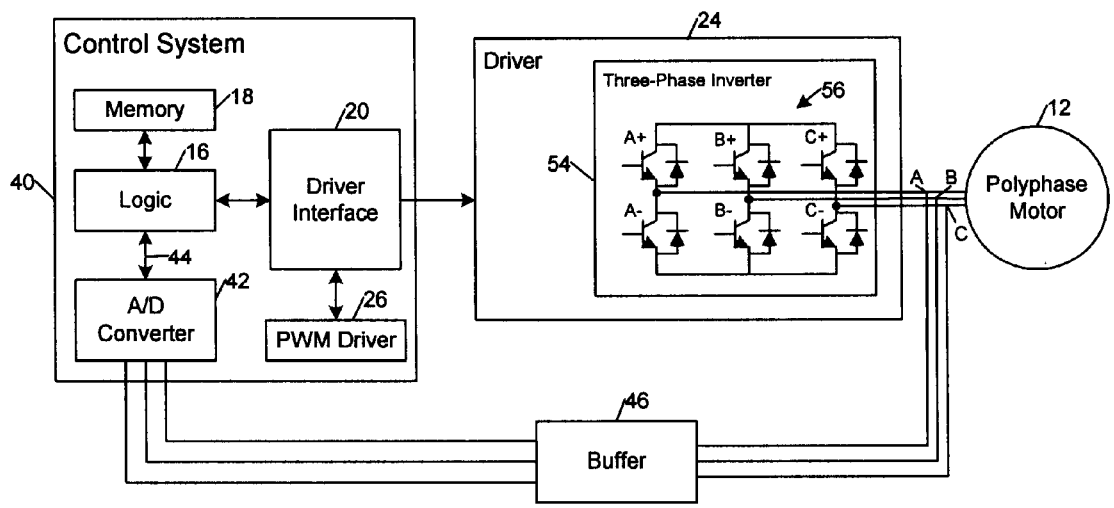
FIG. 2 is a block diagram of a control system, a driver and a buffer coupled between the control system and a polyphase brushless DC motor.
Figure 3:
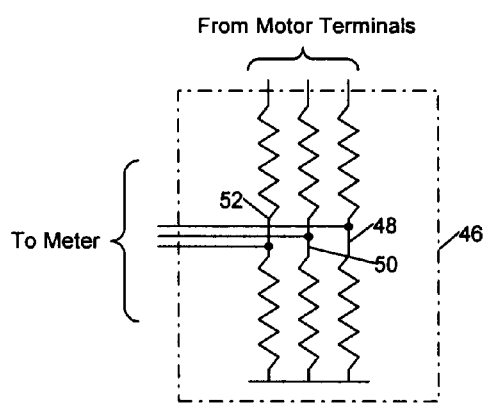
FIG. 3 is a schematic diagram of the buffer of FIG. 2.

Referring to FIGS. 2 and 3, in one embodiment, a motor control system 40 includes an analog-to-digital (A/D) converter 42 that samples the voltages at terminals A–C of motor 12 and produces a digital output 44 that is representative of the sampled voltage values. An input buffer 46 is coupled between terminals A–C of motor 12 and the input of A/D converter 42. Buffer 46 scales the motor terminal voltages to a range (e.g., 0 volts to 5 volts) that is suitable for the inputs of A/D converter 42. As shown in FIG. 3, in one embodiment, buffer 42 includes a voltage divider 48, 50, 52 for each motor terminal A, B, C, respectively. In other embodiments, buffer 46 may include an operational amplifier or other circuit components that are configured to scale the motor terminal voltages to appropriate voltage range. Driver 24 includes a three-phase inverter 54 with a plurality of transistors 56 configured to drive the terminals A–C of motor 12 high (i.e., transistors A+, B+, C+) and low (i.e., transistors A−, B−, C−).

Figure 4A:
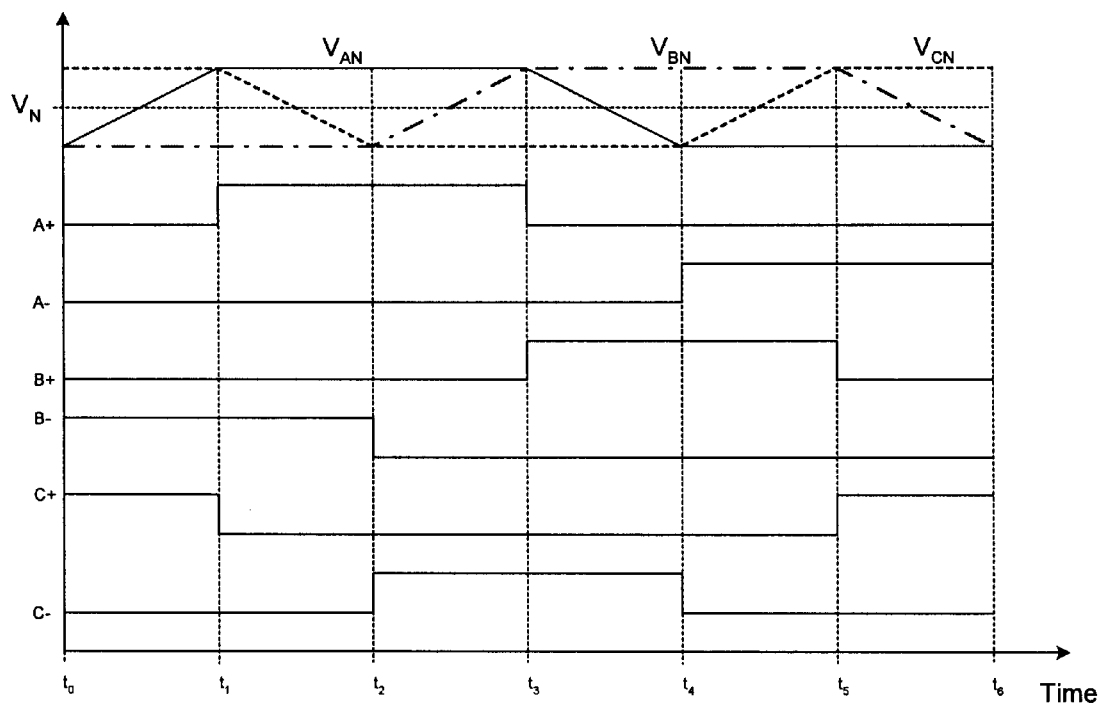
FIG. 4A shows plots over time of signals applied to the transistors of a three-phase inverter driving circuit and the voltages at the terminals of a brushless DC motor in a linear mode of operation.

Referring to FIG. 4A, in one motor driving sequence, control system 40 choreographs the application of drive currents to motor terminals A, B, C, as follows: from times $t_1$ to $t_3$, transistor A+ drives terminal A high, and from times $t_4$ to $t_6$, transistor A− drives terminal A low; from times $t_3$ to $t_5$, transistor B+ drives terminal B high, and from times $t_0$ to $t_2$, transistor B− drives terminal B low; and from times $t_0$ to $t_1$ and from times $t_5$ to $t_6$, transistor C+ drives terminal C high, and from times $t_2$ to $t_4$, transistor C− drives terminal C low. The resulting voltages at terminals A, B and C have the characteristic trapezoidal profiles $V_{AN}$, $V_{BN}$ and $V_{CN}$, respectively. In FIG. 4A, the winding commutation times are labeled $t_0$ through $t_6$; the zero crossings preferably occur midway between the commutation times.

Figure 4B:
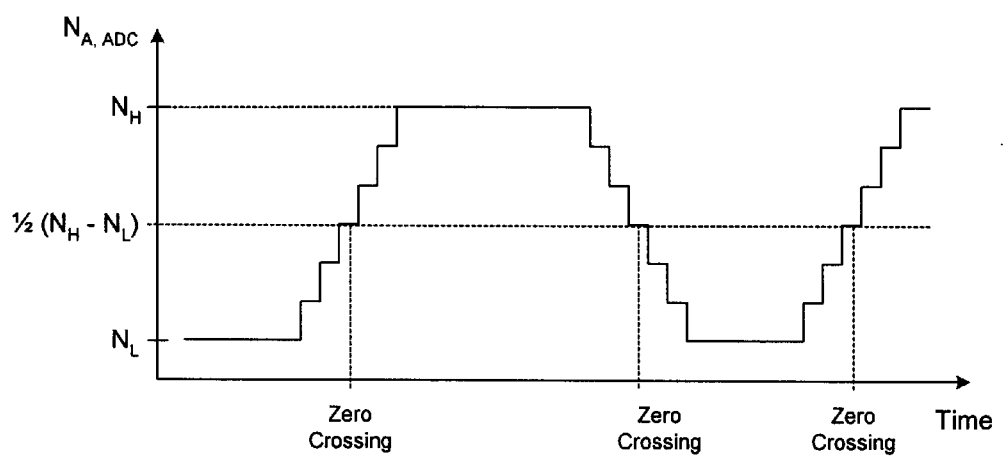
FIG. 4B is a plot over time of digital output values of an A/D converter in the control system of FIG. 2.

As shown in FIG. 4B, A/D converter 42 produces digital outputs ($N_{ADC}$) that are representative of the relative voltages produced at terminals A–C while motor 12 is being driven. The digital A/D converter output tracks the characteristic trapezoidal profile of the terminal voltages ($V_{AN}$, $V_{AN}$, $V_{AN}$). As explained above, control system 10 may identify the zero crossings by detecting when the A/D converter output reaches a value that is equal to one-half of the difference between the local maximum ($N_H$) and the local minimum ($N_L$). From the zero crossing information, control system 10 may determine the proper times to commutate the motor winding.

Figure 5:
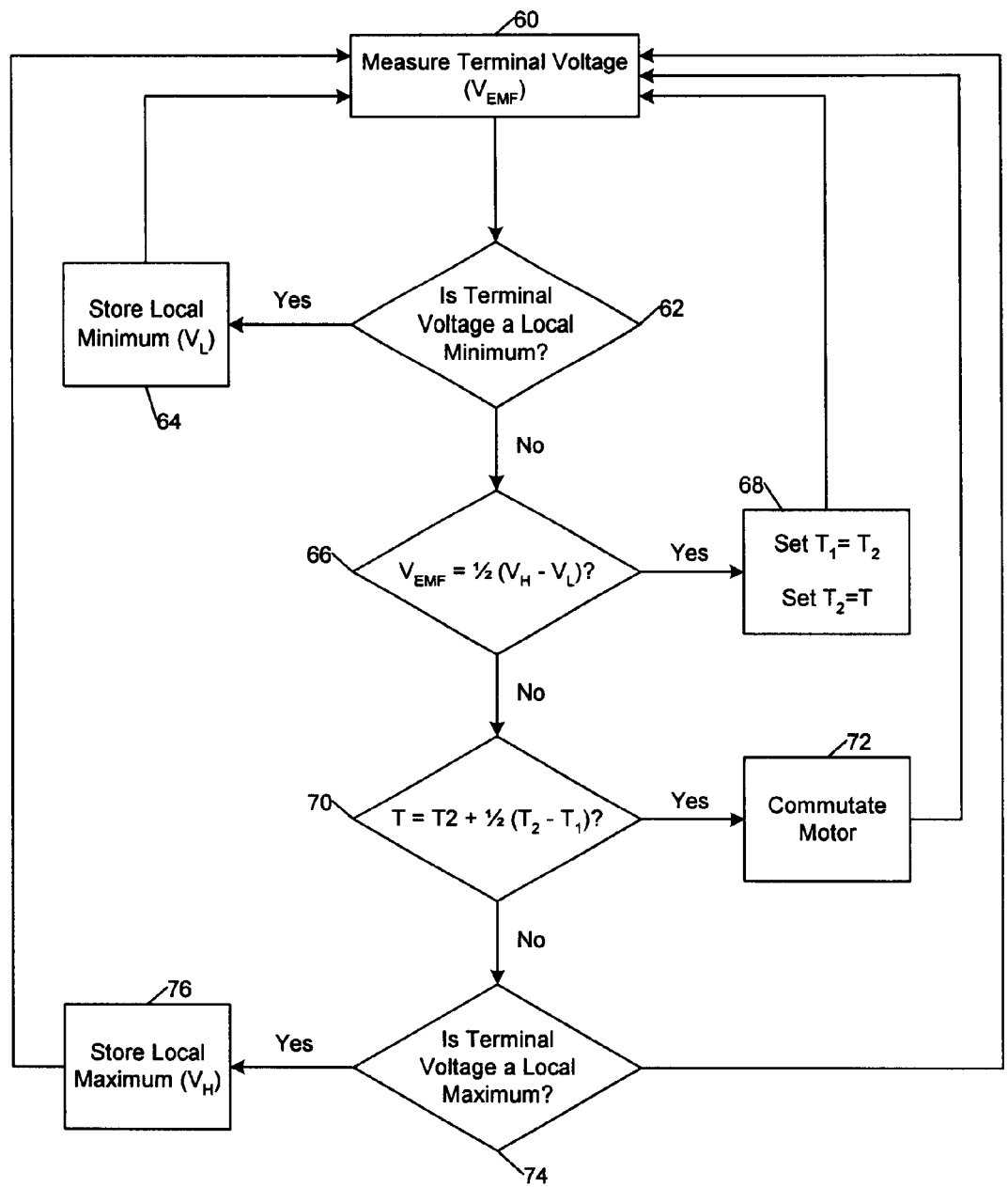
FIG. 5 is a flow diagram of a method of controlling a polyphase brushless DC motor.

Referring to FIG. 5, in one embodiment, control system 10 controls a polyphase brushless DC motor as follows. The back EMF voltage ($V_{EMF}$) produced at a floating motor terminal is measured (step 60). If the measured voltage corresponds to a local minimum (step 62), the local minimum ($V_L$) is stored in memory 18 (step 64). If the measured voltage ($V_{EMF}$) is equal to one-half of the difference between a previously measured local maximum and a previously measured local minimum (step 66), control system 10 determines that a zero crossing has occurred. Control system then sets $T_1$ to the time ($T_2$) of the previous zero crossing, and sets $T_2$ to the current time (T), which corresponds to the most recent zero crossing (step 68). If the current time (T) follows the time ($T_2$) of the most recent zero crossing by one half of the time span between the last two zero crossings (½($T_2$−$T_1$)) (step 70), the motor is commutated (step 72). If the back EMF voltage ($V_{EMF}$) corresponds to a local maximum (step 74), the local maximum ($V_H$) is stored in memory 18 (step 76). The process (steps 60–76) is repeated for each motor terminal and each motor commutation driving cycle.

By updating the values of the local maximum ($N_H$) and the local minimum ($N_L$) every cycle, control system 10 readily accommodates component drifts that might be caused by aging or temperature variations.

Figure 6A:
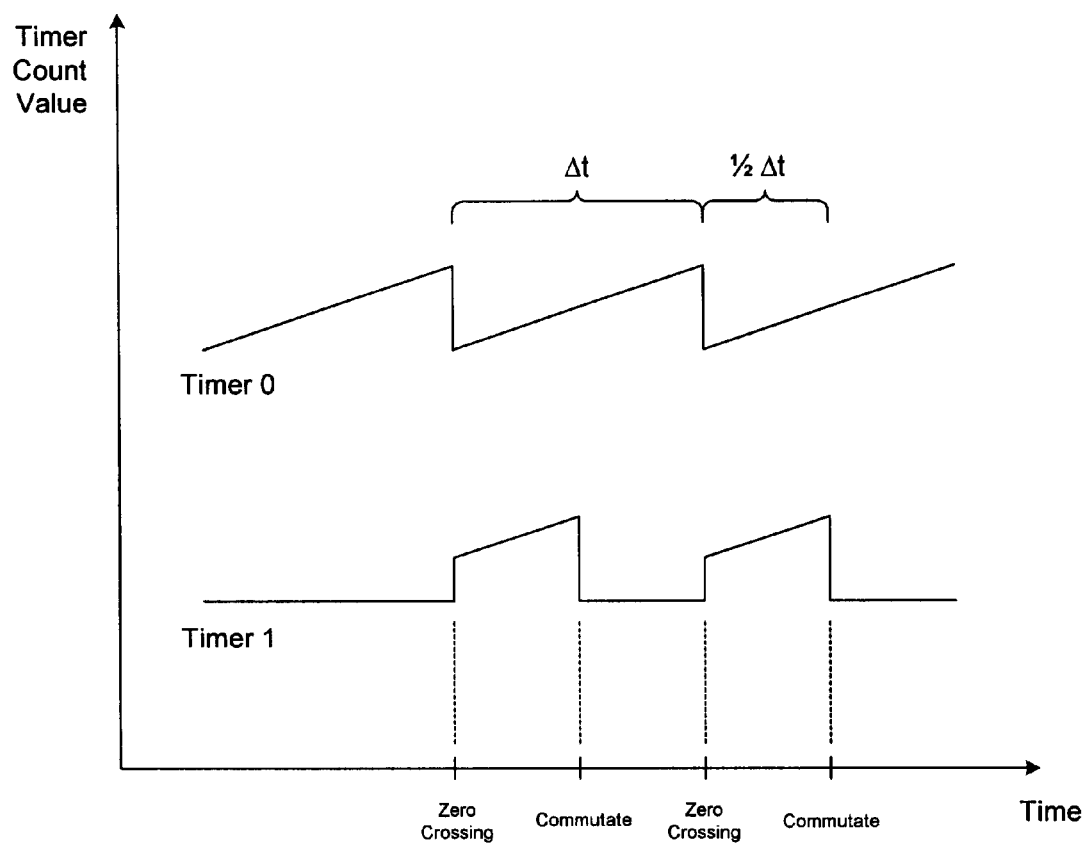
FIG. 6A shows plots over time of output signals of two timers configured to implement the method of FIG. 5.
Figure 6B:
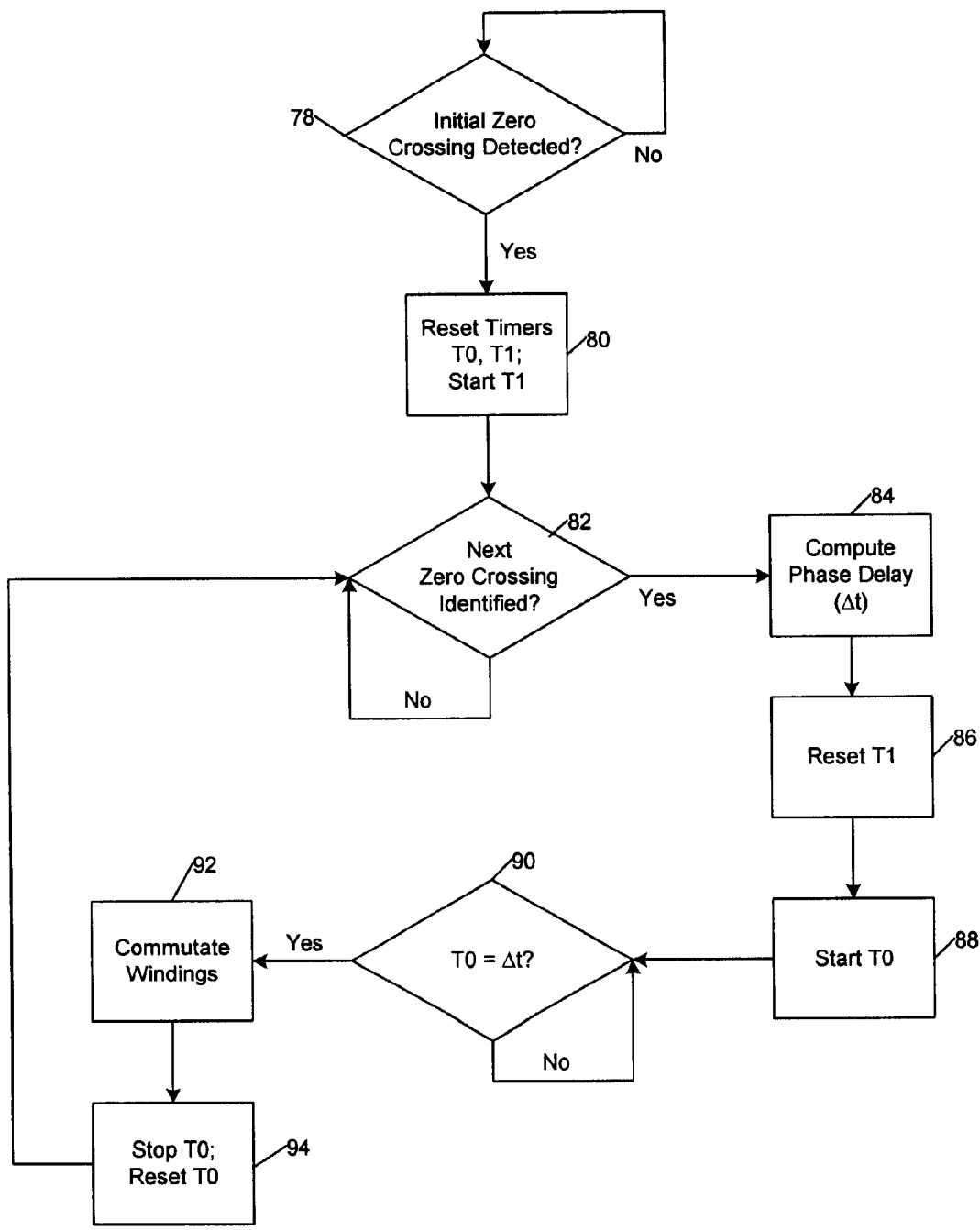
FIG. 6B is a flow diagram of a method of controlling a polyphase brushless DC motor implemented using two timers.

Referring to FIGS. 6A and 6B, in one embodiment, the control method of FIG. 5 may be implemented using two timers (T1, T0), as follows. After an initial zero crossing is detected (step 78), the timers T1, T0 are reset and timer T1 is started (step 80). When the next zero crossing is identified (step 82), the value of timer T1 corresponds to the period (Δt) between two adjacent zero crossings. At this time, a commutation phase delay (½Δt) is computed (step 84), timer T1 is reset (step 86), and timer T0 is started (step 88). When the value of timer T0 is equal to the computed phase delay (step 90), the appropriate motor winding is commutated (step 92) and the timer T0 is stopped and reset (step 94). The process (steps 82–94) is repeated every motor commutation cycle.

Other embodiments are within the scope of the claims. For example, although the above embodiments have been described in connection with three-phase brushless DC motors, these embodiments easily may be extended to operate with any polyphase brushless DC motor.

What is claimed is:

1. A system for controlling a polyphase brushless direct current (DC) motor having a plurality of phase windings energizable by timed application of drive voltages to a plurality of motor terminals resulting in back electromotive force (EMF) conditions at the motor terminals, comprising:
    a meter coupled to a motor terminal and adapted to produce a series of digital output values representative of a motor terminal signal from which a back EMF signal is derivable;
    a monitoring circuitry coupled to the meter and configured to generate one or more monitoring values from the series of digital output values produced by the meter;
    a memory configured to receive and store the monitoring values generated by the monitoring circuitry during previous driving cycles of the motor; and
    a control circuitry coupled to the meter and configured to identify a phase-to-phase zero-crossing in the back EMF signal during a subsequent driving cycle of the motor using the monitoring values in the memory for the previous driving cycles of the motor.

2. The system of claim 1, wherein the meter comprises an analog-to-digital (A/D) converter.

3. The system of claim 1, further comprising a buffer coupled between the motor terminal and the meter and configured to scale terminal signal values to a selected range.

4. The system of claim 3, wherein the buffer comprises a voltage divider.

5. The system of claim 1, wherein:
    the monitoring circuitry is configured to update the monitoring values in the memory.

6. The system of claim 1, wherein:
    the monitoring circuitry is configured to generate monitoring values that include a maximum or a minimum of the back EMF signal during one or more previous driving cycles.

7. The system of claim 1, wherein:
    the monitoring circuitry and the control circuitry are implemented in a controller coupled to the meter.

8. The system of claim 7, wherein:
    the controller is configured to calculate a motor commutation time based on the phase-to-phase zero-crossing identified in the back EMF signal during the subsequent driving cycle and a phase-to-phase zero-crossing identified in the back EMF signal during a previous driving cycle.

9. A system for controlling a polyphase brushless direct current (DC) motor having a plurality of phase windings energizable by timed application of drive voltages to a plurality of motor terminals resulting in back electromotive force (EMF) conditions at the motor terminals, comprising:
    a pulse width modulation (PWM) circuit;
    a meter coupled to a motor terminal, synchronized with the PWM circuit and configured to produce an output representative of a motor terminal signal from which a back EMF signal is derivable;
    a monitoring circuitry coupled to the meter and configured to generate one or more monitoring values from the output produced by the meter during previous driving cycles of the motor; and
    a control circuitry coupled to the meter and configured to identify a phase-to-phase zero-crossing in the back EMF signal during a subsequent driving cycle of the motor using the monitoring values for the previous driving cycles of the motor.

10. The system of claim 9, wherein the meter is adapted to sample motor terminal voltages in a non-conducting motor phase at times when each conducting motor phase is being driven.

11. The system of claim 9 wherein the meter is synchronized with the PWM circuit so that the back EMF signal is derived from the samples of the motor terminal signal at the minima of spike voltages resulting from the PWM circuit.

* * * * *